Jan. 2, 1945.  D. H. CLARK  2,366,386
ROTARY CULTIVATOR MOUNTING AND CONTROL UNIT
Filed April 10, 1942  5 Sheets-Sheet 2
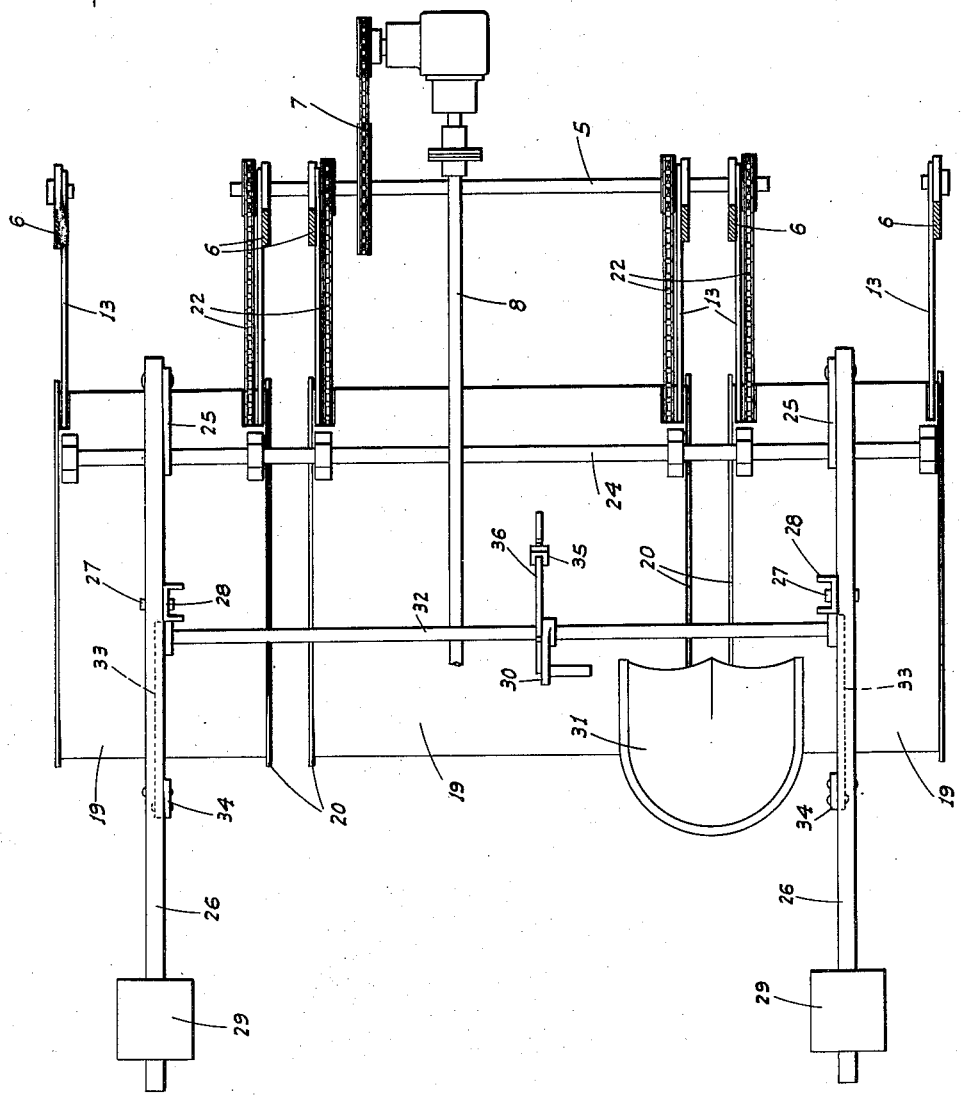
INVENTOR
D. H. Clark
BY
ATTYS Jan. 2, 1945.  D. H. CLARK  2,366,386
ROTARY CULTIVATOR MOUNTING AND CONTROL UNIT
Filed April 10, 1942  5 Sheets-Sheet 3
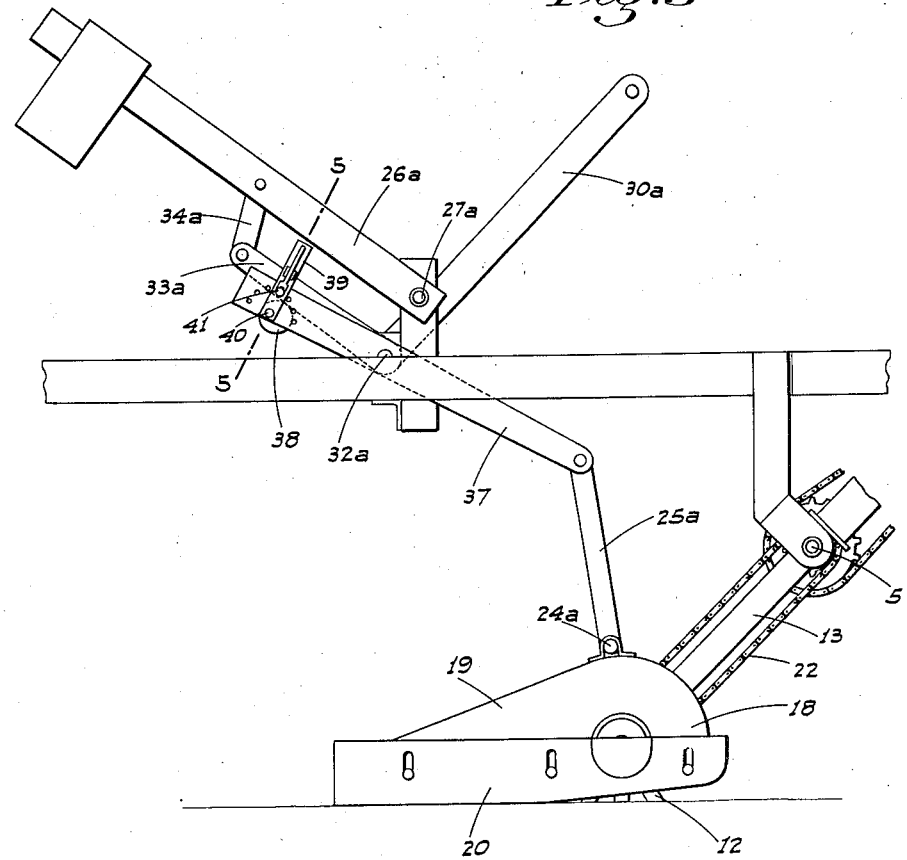
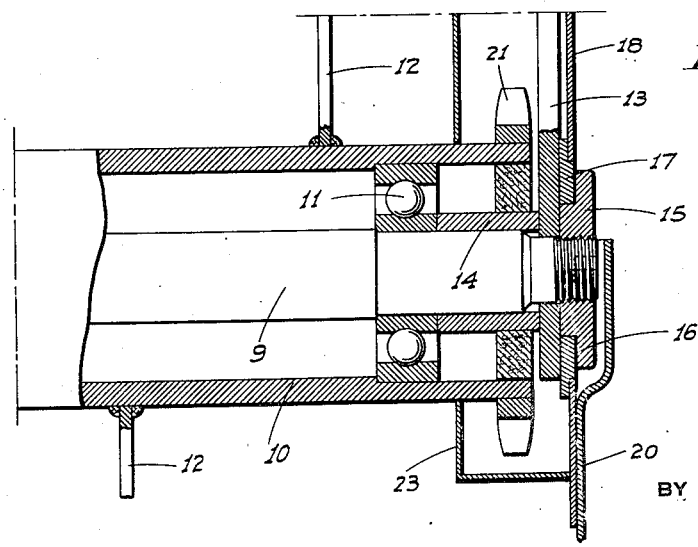
INVENTOR
D. H. Clark
BY
Webster Webster
ATTYS Jan. 2, 1945.  D. H. CLARK  2,366,386
ROTARY CULTIVATOR MOUNTING AND CONTROL UNIT
Filed April 10, 1942  5 Sheets-Sheet 4
Fig. 4
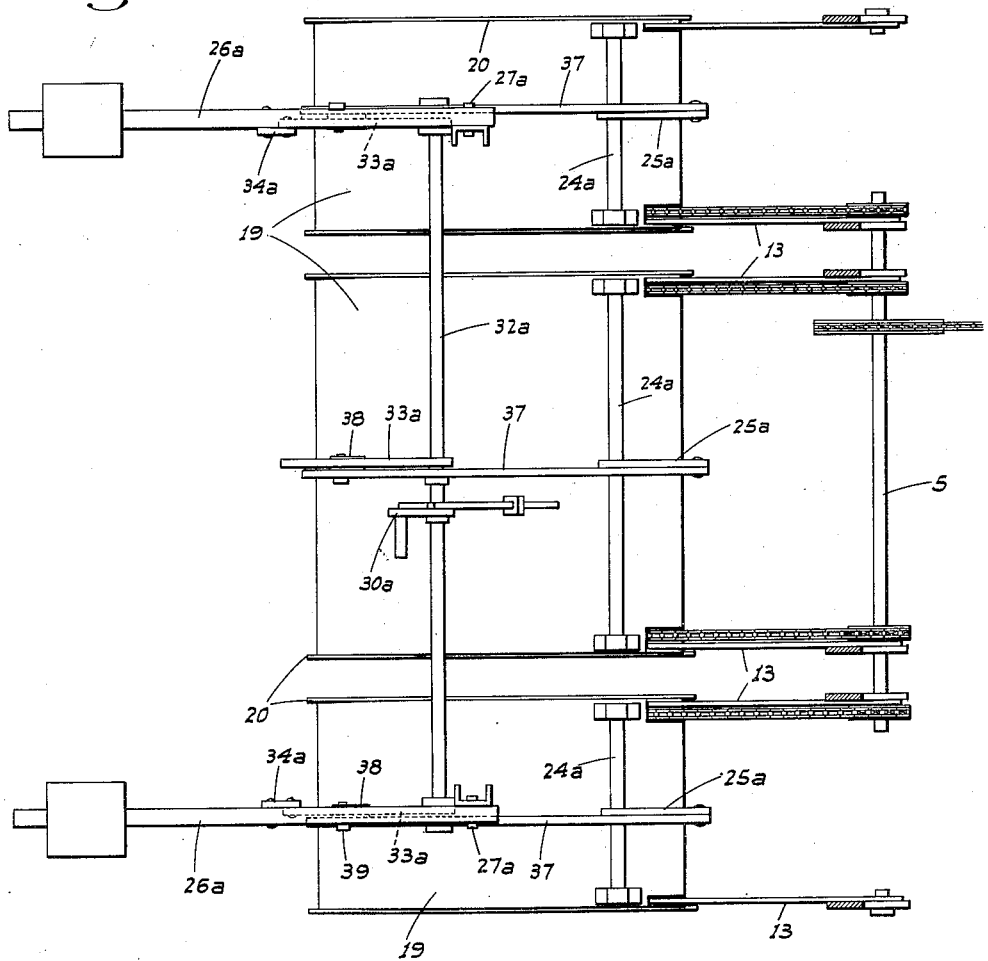
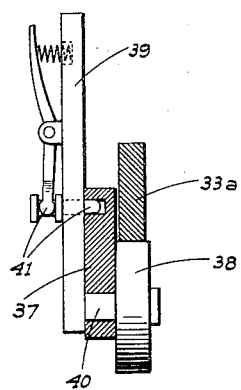
Fig. 5
INVENTOR
D. H. Clark
BY
*Webster & Webster*
ATTYS

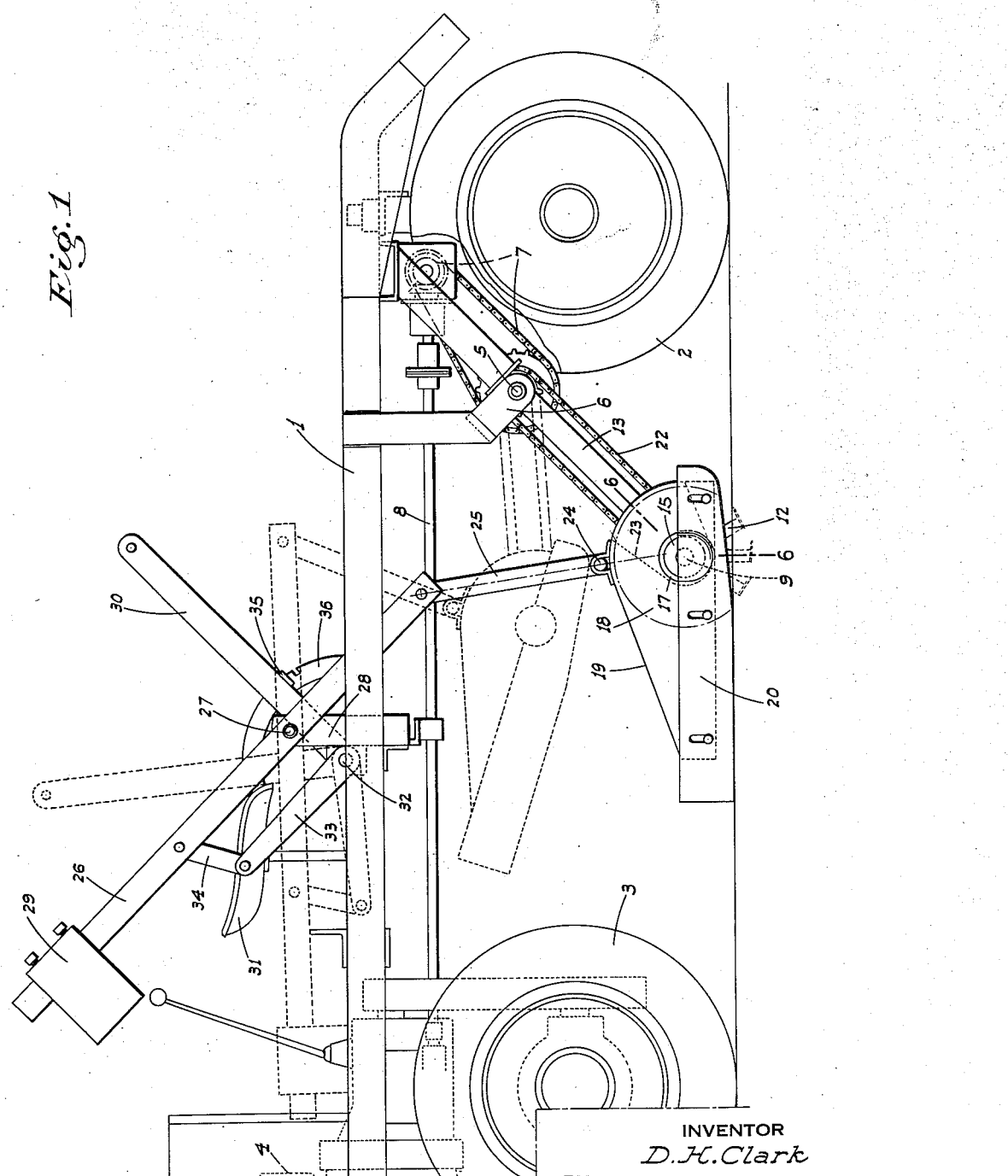

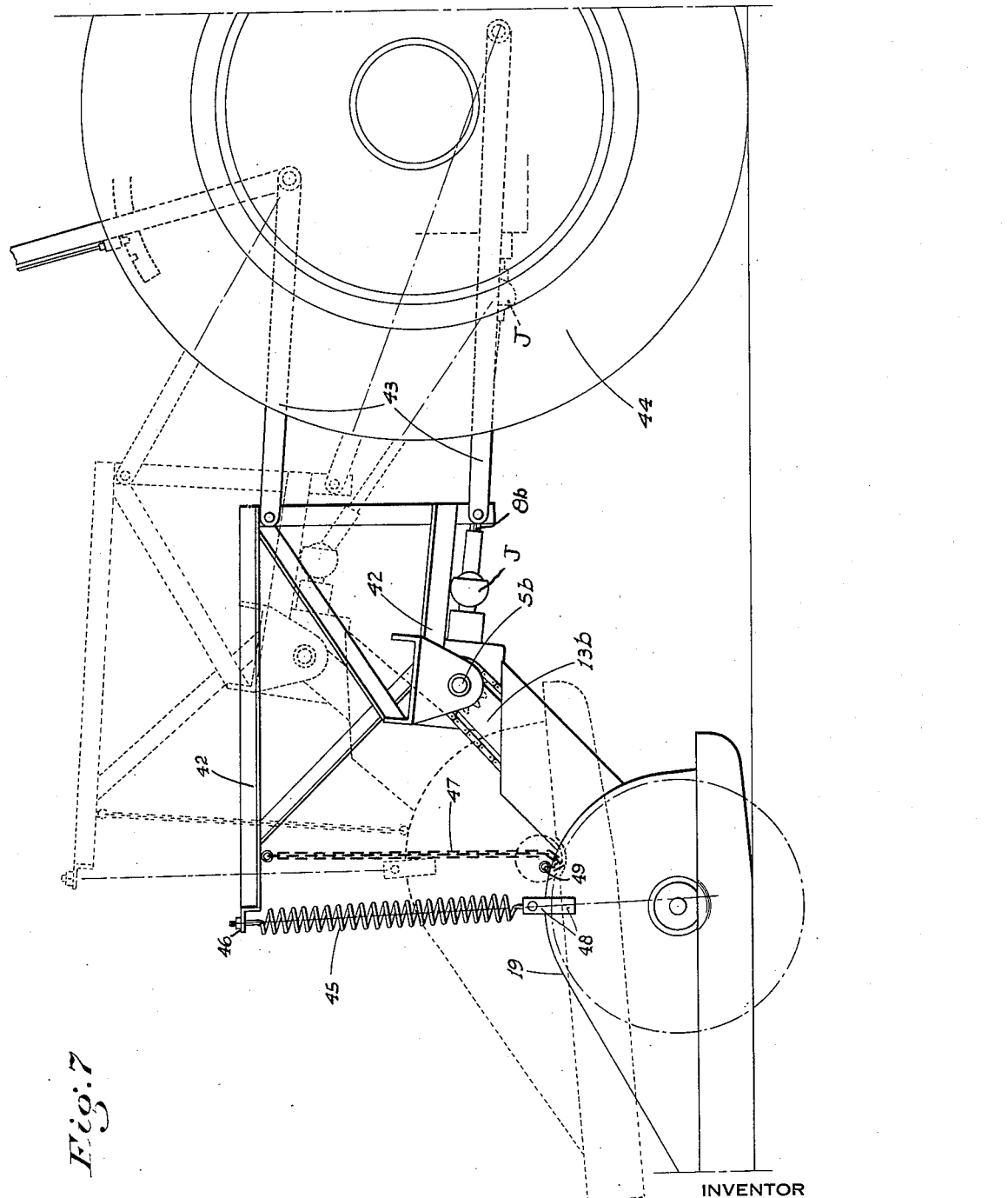

Patented Jan. 2, 1945

2,366,386

UNITED STATES PATENT OFFICE 2,366,386

ROTARY CULTIVATOR MOUNTING AND CONTROL UNIT

Donald H. Clark, Sacramento, Calif.

Application April 10, 1942, Serial No. 438,369

7 Claims. (Cl. 97—40)

This invention relates to ground working implements and particularly to a rotary cultivator unit adapted to move and cultivate the ground between rows of growing crops.

One object of the invention is to mount each unit so that it is substantially counterweighted when in operative position and is thus floatably supported at its working depth.

The complete apparatus preferably includes a number of separate cultivating units disposed in alined and spaced side by side relation, and a further object is to apply the counterweighting means to the units so that while said means acts on all the units to impart a lifting force thereon, any suit can yield upwardly of itself without the remainder.

A still further object is to apply the counterweight means to each unit at such a point thereon that the unit will very readily lift of itself when encountering an underground obstacle, so as to thus prevent possible damage to the cultivating elements, and to permit the units to follow the surface of the ground.

Any such rotary cultivator will naturally throw considerable dirt into the surrounding air and if such dirt is light and dry and is not properly confined, it tends to cover the adjacent portion of the machine and has a detrimental abrasive action on the working parts, besides making very poor working conditions for the operator, both as respects his comfort and visibility if the wind is blowing.

A further object of the invention therefore is to provide a hood for each unit so mounted as to completely enclose the dirt thrown about by the rotary cultivating elements, and so that it may rotate axially of the cultivating elements and relative thereto, in such a manner as to confine all of the dirt regardless of ground conditions.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of one form of my counter-balanced cultivator structure, as mounted on a self-propelled chassis.

Figure 2 is a top plan view of the structure detached from the chassis.

Figure 3 is a side elevation of another form of counter-balanced structure.

Figure 4 is a top plan view of the same.

Figure 5 is a fragmentary enlarged cross section on the line 5—5 of Fig. 3.

Figure 6 is a fragmentary enlarged transverse section taken on the line 6—6 of Fig. 1, showing a typical cultivator unit drive and special hood mounting, which is common to all forms of the structure.

Figure 7 is a side elevation of still another form of counterweighted cultivator structure, as mounted on the rear end of a tractor.

Referring now more particularly to the characters of reference on the drawings, and particularly at present to Figs. 1, 2, and 6, the supporting structure for the cultivator comprises a frame which includes side beams 1, the frame being mounted on front and rear wheels 2 and 3, the former being steerable, while the latter are driven in any suitable manner from an engine indicated at 4 mounted on the chassis.

A transverse shaft 5 is disposed just rearwardly of the front wheels well clear of the ground, being journaled in hangers 6 supported from the beams 1. This shaft is driven from the engine in any suitable manner such as by a combination chain and gear drive indicated at 7, the latter being driven from the power take-off shaft of the engine by a longitudinally extending shaft 8 disposed above the highest point of the lift of the cultivator units.

The cultivator units which are alined but separated transversely of the machine to avoid crop rows, each includes a central axial shaft 9, a sleeve 10 turnable on anti-friction bearings 11 on said shaft, and ground working elements of suitable character which are here shown as including shanks 12 rigid with and projecting from the sleeve, as clearly shown in Fig. 6.

The shaft 9 projects beyond the ends of the sleeve, and a tension arm 13 extends between the shaft 5 and each end of the shaft 9 and engages the latter, which does not need to turn. Each arm is clamped in a fixed position with the shaft by means of a spacer 14 on the shaft between the inner race of the adjacent bearing 11 and the adjacent face of said arm, and a nut 15 secured on the outer end of the shaft and engaging the outer face of the arm.

The nut is shaped with a circular portion of reduced size projecting toward the arm, and forming a circumferential groove 16 with the adjacent face of the arm. in which groove a disc 17 is turnable, said disc being supported on said circular portion of the nut. Side plates 18 of a cultivator enclosing hood 19 are fixed on the discs, the plates and hood as a whole projecting some distance rearwardly from the rotating unit and terminating a sufficient distance above the bottom of the latter to enable the same to project the necessary working distance below ground level. Vertically adjustable side extension plates 20 are secured on the side plates 18 and substantially ride on the ground, the lower edge of said extension plates at the front sloping upwardly slightly as shown so as to avoid any abrupt corners.

A sprocket 21 is secured on the sleeve 10 at one or both ends, as the case may be, and immediately adjacent the corresponding arm 13, a chain drive 22 connecting said sprocket and the shaft 5. That portion of said drive and the arms 13 within the hood are enclosed by a surrounding shell or well 23, one wall of which is formed by the adjacent plate 18, as shown in Fig. 6. It will thus be seen that each rotary cultivator unit is completely enclosed, while the adjacent portion of the corresponding chain drive is protected from contact with dirt thrown about by the cultivating elements. It will also be seen that the hood is free to turn relative to the cultivator unit, while forming a means for engagement with a control and lifting device, whereby the entire unit may be raised or lowered, and as will now be described.

The hoods at the top are connected by a cross bar 24 which also serves as the pivot mounting for upstanding pull links 25. These links at their upper end are connected to the forward end of levers 26 which extend lengthwise of the beams 1 and which are pivoted intermediate their ends as at 27 on supports 28 upstanding from said beams. Adjustable weights 29 are mounted on the levers rearwardly of their pivot, being disposed so that the gravitational downward pressure and the downward pull or suck of the cultivator units overcomes the effectiveness of the weights only sufficient to maintain the units in working position. It will be noted that when the units are in a working position, a line drawn centrally through the links 25 and bar 24 will pass ahead of the central shaft 9, as indicated in Fig. 1. This causes the weights to impart a lifting action to the hoods ahead of the center of the cultivator units, thus tending to cause the hoods to ride with an upward slope from the rear so that at the rear they make the desired proper close contact with the ground. This feature also causes a more ready upward tilting of the hoods if an obstruction is encountered.

The units are definitely pulled clear of the ground when desired by means of a hand lever 30 conveniently positioned near the operator's seat 31 on the chassis.

The lever is fixed on a shaft 32 journaled on the beams 1 below the pivot 27. Radial arms 33 project rearwardly from said shaft 32 below and substantially parallel to the lever 26, to which they are connected by links 34. A pull-back on the lever 30 thus raises the forward end of levers 26, lifting the cultivator units to whatever extent is desired. The lowered position of the unit is governed by an adjustable lever stop 35 on a quadrant 36 associated with the lever 30, which stop limits the forward and downward movement of the lever without interfering with its rearward movement. In this manner the cultivator units may yield upwardly without restraint if they encounter an obstruction.

In the form of the invention shown in Figs. 3, 4, and 5, the cultivator units and their mounting and drive are identical with the structure above described. However, there is an individual top hood bar 24a for each hood, each bar being connected to an upstanding link 25a. Also the counterweight levers 26a terminate at their forward and adjacent end pivot 27a. Connection between each link 25a and the counterweight levers, to enable any unit to yield upwardly without the remainder, is as follows:

Auxiliary levers 37 extend rearwardly from the upper end of the different links 25a and are turnably pivoted intermediate their ends on the shaft 32a of the hand lever 30a. The arms 33a which project rearwardly from the shaft 32a extend along the rear portion of levers 37, closely adjacent thereto. Those arms 33a which are at the ends of the shaft 32a and adjacent the levers 26a are connected to the latter by links 34a. Turnably mounted on the levers 37 and projecting under the adjacent portion of the corresponding arms 33a for engagement thereby are stops in the form of eccentrics or cams 38, whose position or level on the levers 37 is controlled by handles 39 fixed with the pivot shafts 40 of the eccentrics; a suitable holding means 41 (see Fig. 5) being provided between each handle and its lever 37 to prevent movement of the corresponding eccentric when once set. By this means the working depth of the different cultivator units may be independently adjusted, while their common adjustment is governed by manipulation of the lever 30a.

In the arrangement shown in Fig. 7 the cultivator units are the same as before, but the tension arms 13b project from the transverse drive shaft 5b which is carried on a vertically movable frame structure 42; the operating or engine driven shaft 8b for said drive shaft 5b including universal joints J. This frame is connected by vertically spaced longitudinally extending tension links 43 to the tractor 44 adjacent its rear end, so that if an upward pull is imparted to one link the frame 42 will move upwardly in a substantially straight path, as indicated.

In this form of the device the counterweight is omitted and tension springs 45 are connected between each unit hood 19 and an overhanging cross beam 46 on the frame 42 at its rear end, and which springs substantially hold the units in floating relation to the ground. When the units are raised for transportation clear of the ground, their weight is then taken by normally slack elements also connecting the frame 42 and the hoods, such as chains 47. The connection between each spring and the hood unit may be made by an ear 48 on one side of the hood unit, while each chain may be connected to the hood unit by an eye 49 on the top of the hood.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A rotary cultivator comprising a frame movable along the ground, a rotary cultivating unit including an axial member, a pull arm connecting said member and the frame and pivoted on the latter whereby the unit may be raised and lowered, a ground engaging hood surrounding the upper portion of the unit and turnably mounted for rotation about said axial member and counterbalance means mounted on the frame and including a depending pull element connected to the hood above the axial member and at a point relative thereto such that the lifting force of the counterbalance means tends to rotate the hood rearwardly about the axial member.

2. A rotary cultivator comprising a frame movable along the ground, a rotary cultivator unit including an axial member extending transversely of the frame, a pull arm extending from said member to the frame and pivoted on the latter, a ground engaging hood turnably mounted on the axial member for rotation thereabout and enclosing the upper portion of the unit, a link upstanding from and connected to the top of the hood at a point thereon such that an upward pull applied to the link will tend to rotate the hood rearwardly, and means connected to the link to constantly exert such upward pull thereon.

3. A rotary cultivator comprising a frame movable along the ground, a rotary cultivator unit including an axial member extending transversely of the frame, a pull arm extending from said member to the frame and pivoted on the latter, a ground engaging hood turnably mounted on the axial member for rotation thereabout and enclosing the upper portion of the unit, and means exerting a constant upward pull on the hood tending to lift the unit in opposition to its weight and tending to rotate the hood rearwardly.

4. A rotary cultivator comprising a frame movable along the ground, a plurality of separate rotary cultivator units arranged in transverse alinement below the frame, means separately connecting the several units and the frame whereby the units may independently move vertically relative to the frame, a transverse shaft mounted on the frame, a plurality of arms, one for each unit, secured on and projecting rearwardly from the shaft, counterweight means applied to the shaft in a direction to turn the arms down, levers alongside the arms and pivoted intermediate their ends on the shaft for rotation thereon, connecting links between the levers at their forward end and the respective individual cultivator units and a stop on each lever extending under and normally engaging the corresponding arm.

5. A rotary cultivator comprising a frame movable along the ground, a cultivating unit, means flexibly connecting the unit and frame whereby the unit may move vertically relative to the frame, a counterweighted lever fulcrumed on the frame, and tending to drop at its outer end, an auxiliary lever independent of and vertically spaced from the first lever and pivoted intermediate its ends on the frame, a link connecting one end of the auxiliary lever and the unit, and elements on the counterweighted lever and the free end of the auxiliary lever, which elements are in frictional sliding engagement with each other, whereby the weight of the counterweighted lever will be imparted to such free end of the auxiliary lever and tend to lift the unit while allowing the unit to rise upwardly independently of the lifting action of said counterweighted lever.

6. A rotary cultivator comprising a frame movable along the ground, a cultivating unit, means flexibly connecting the unit and frame whereby the unit may move vertically relative to the frame, a counterweighted lever fulcrumed on the frame, and tending to drop at its outer end, an auxiliary lever independent of and vertically spaced from the first lever and pivoted intermediate its ends on the frame, a link connecting one end of the auxiliary lever and the unit, an arm pivoted on the frame and lying adjacent the auxiliary lever, a stop on the auxiliary lever engaging the arm, and a link connecting the free end of the arm to the counterweighted lever.

7. A rotary cultivator comprising a frame movable along the ground, a cultivating unit, means flexibly connecting the unit and frame whereby the unit may move vertically relative to the frame, a counterweighted lever fulcrumed on the frame, and tending to drop at its outer end, an auxiliary lever independent of and vertically spaced from the first lever and pivoted intermediate its ends on the frame, a link connecting one end of the auxiliary lever and the unit, an arm pivoted on the frame and lying adjacent the auxiliary lever, a stop on the auxiliary lever engaging the arm, and a link connecting the free end of the arm to the counterweighted lever; said stop being in the form of an adjustable eccentric cam whereby the radial relationship of the auxiliary lever and arm may be selectively altered.

DONALD H. CLARK.